United States Patent Office 3,305,609
Patented Feb. 21, 1967

3,305,609
DIMETHYL 2-CHLORO-1-(2,5-DICHLOROPHENYL) VINYL PHOSPHATE
Loyal F. Ward, Jr., and Donald D. Phillips, Modesto, Calif., assignors to Shell Oil Company, New York, N.Y., a corporation of Delaware
No Drawing. Filed Jan. 25, 1963, Ser. No. 253,980
1 Claim. (Cl. 260—957)

This invention relates to a new phosphorus-containing ester which has been found to be particularly useful as an insecticide.

Over the years, there has been an ever-increasing trend to "do it yourself." Consequently, there has been a corresponding increase in the number of homeowners, home gardeners, small truck gardeners, and small farmers who want to protect their plants from insects themselves, rather than hiring specialists to do it for them. None of these people is particularly skilled in the art of handling insecticide concentrates and the field sprays, in formulating field sprays from the concentrates, and in applying the sprays. They usually are reluctant to take the precautions—special clothing, face masks, goggles, etc.—required to protect them from the effects of an insecticide which contacts their skin, is inhaled or is blown into their eyes. There is, therefore, great need for compounds which will effectively kill insects, yet which are harmless to the persons handling and applying them who take ordinary precautions to avoid injury by the compound used. A further reason for the discovery and development of such insecticides is the fact that even professional applicators prefer materials which are innocuous to them, since it reduces the chance of their injury. Ordinarily, high insecticidal activity in a compound is accompanied by a high level of toxicity to mammals. The combination in one compound or class of compounds of a high insecticidal activity and low mammalian toxicity is rare, and few compounds have been found to possess it. This is abundantly evident when one compares the number of insecticides on the market which can be used with but ordinary precaution by the average person, and the number of materials which have been found to be insecticidally active and proposed as commercial insecticides. Patents alone disclose hundreds of insecticides which cannot be used by any but a skilled operator wearing special clothing and taking other precautions against injury by the insecticides.

There now has been discovered a compound that is an effective insecticide, yet which has outstandingly low mammalian toxicity. This compound is dimethyl 2-chloro-1-(2,5-dichlorophenyl)vinyl phosphate of the formula:

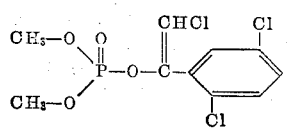

The compound of this invention is readily prepared by reacting trimethyl phosphite with 2,2,2',5'-tetrachloroacetophenone as follows ("parts" means parts by weight unless otherwise indicated, with parts by weight bearing the same relationship to parts by volume as does the kilogram to the liter):

EXAMPLE I.—DIMETHYL 2-CHLORO-1-(2,5-DICHLOROPHENYL)VINYL PHOSPHATE

A. *Preparation of 2,2,2',5'-tetrachloroacetophenone*

100 parts of aluminum chloride was mixed with 100 parts of p-dichlorobenzene. To this mixture, stirred and at about room temperature, was added 80 parts of dichloroacetyl chloride, over a period of 1.25 hours. The mixture then was heated to 95° C. and an additional 28 parts of dichloroacetyl chloride was added over a one-hour period. The mixture then was maintained at 95–105° C. for an additional 2.25 hours, then was cooled slightly and the complex that had been formed was decomposed by pouring the whole mixture into a mixture of ice and hydrochloric acid. The resulting mixture was extracted with ether, the extract washed with water, then with dilute sodium hydroxide solution, then with water until neutral, then dried. The solvent then stripped off, to a bottoms temperature of 100° C. at 0.05 torr to give 135 parts of 2,2,2',5'-tetrachloroacetophenone. The product was identified by elemental chlorine analysis. Calculated chlorine content (percent by weight): 55.0. Chlorine content found (percent by weight): 55.0.

B. *Preparation of 2-chloro-1-(2,5-dichlorophenyl)-vinyl dimethyl phosphate*

33 parts of 2,2,2',5'-tetrachloroacetophenone (prepared as above) was mixed with 19.1 parts of trimethyl phosphite, over a 15-minute period, the temperature of the mixture being maintained at about 55° C. 25 parts by volume of the phosphite then was added and the mixture was heated to 95° C. and maintained at that temperature for 30 minutes. The mixture then was cooled to room temperature, filtered and the solid washed with pentane to give 27 parts of 2-chloro-1-(2,5-dichlorophenyl)vinyl dimethyl phosphate as a white solid, melting point: 103–104° C. The product was identified by elemental analysis.
*Analysis.*—Calculated (percent by weight): P, 9.4; Cl, 32.1. Found (percent by weight): P, 9.6; Cl, 32.4.

The identification was confirmed by infra-red spectrum analysis.

The compound of this invention has been found to be an effective insecticide, against a variety of insects typical of various kinds of insects, including flies, moths, mosquitoes, worms, caterpillars, weevils and beetles. The compound is stable on storage, is essentially non-phytotoxic at insecticidally effective dosages, is effective in soil and is particularly effective against dipterous insects (flies), coleopterous insects (beetles), caterpillars, and worms.

By the term "insects" this is meant not only the members of the class Insecta, but also related or similar invertebrate animal organisms belonging to the allied classes of arthropods and including ticks, mites, spiders, and the like.

The compound of this invention is effective against the immature forms of insects as well as against the mature forms which attack plants. Thus, this compound kills "worms," by which is meant not only the true worms, but also those immature forms of insects—larvae, etc.—which are generally known as "worms," and including larvae of the western spotted cucumber beetle (*Diabrotica undecimpunctata undecimpunctata*), corn earworms (*Heliothis zea*), cabbage worms (*Pieris rapae*), Pacific Coast wireworms (*Limonius canus*), and the like.

The effectiveness of the compound of this invention as an insecticide is demonstrated by the following experiments and the results thereof.

In the interest of brevity, in the following examples, the compound of the invention will be referred to as Compound A.

EXAMPLE II

Solutions of Compound A were made up employing either a neutral petroleum distillate boiling within the kerosene range or acetone as the solvent. Tests were carried out against the pea aphid (*Macrosiphum pisi*), by spraying groups of plants infested with the insects under controlled conditions which varied from one test to the other only with respect to the concentration of the toxic agent. Thus, in each of the several tests, the same total volume of spray was used. Tests were carried out using the common housefly (*Musca domestica*), as the test insect, the method used being that described by Y. P. Sun, Journal of Economic Entomology, volume 43, pp. 45 et seq. (1950). Table I shows the concentration of toxic agent in the sprayed solution required to cause 50 percent mortality of the test insect—i.e., the $LC_{50}$ concentration. Similar tests were conducted using the vinegar fly (*Drosophila melanogaster*), as the test insect. The results ($LC_{50}$) are reported in Table I. The activity of compound A with respect to the corn earworm (*Heliothis zea*), was determined by caging corn earworm larvae on cut broad bean plants inserted in water after formulations of Compound A, prepared by dissolving acetone solutions of Compound A in water, had been sprayed thereon. Two replicates were used with each test, various tests being directed to different concentrations of the test compound in the liquid formulations. The $LC_{50}$ values are set out in Table I. In a similar manner, tests were conducted with respect to caterpillars of the diamondback moth (*Plutella maculipennis*), the imported cabbage worm (*Pieris rapae*) and larvae of the elm leaf beetle (*Galerucella luteola*), with the results ($LC_{50}$) being set out in Table I. The activity Compound A with respect to the rice weevil (*Sitophilus oryza*), was determined by pouring a measured amount of a solution of the compound over adult rice weevils in a container having a perforated bottom, excess solution immediately draining away. Ten seconds after the solution had been poured on the weevils, the weevils were dried with blotter paper, transferred to containers and held in a controlled temperature and humidity room for 24 hours. Counts were then made to determine the number of weevils killed (which includes moribund weevils). Several replicates were conducted, several concentrations of the test compound in the solution being used. Table I sets out the $LC_{50}$ concentrations of the compound of the invention with respect to these weevils.

TABLE I

[Median lethal concentration ($LC_{50}$) (grams per 100 milliliters solvent)]

Test material:
 Compound A—
  Pea aphid _____ 0.0004
  Housefly _____ 0.037
  Corn earworm _____ 0.008
  Rice Weevil _____ 0.0073
  Diamond back moth _____ 0.00076
  Cabbage worm _____ 0.0024
  Elm leaf beetle _____ 0.0049

EXAMPLE III

During the conduct of these insecticidal tests, there was observed no phytotoxicity of the insecticide at the concentrations used.

EXAMPLE IV

It has been found that the acute oral mammalian toxicity ($LD_{50}$ in milligrams per kilogram of body weight, male mice, and rats) of the compound of the invention is very low, the $LD_{50}$ dosage of Compound A being greater than 2000.

The compound of this invention can be employed for insecticidal purposes by the use of any of the methods which are conventionally employed in the art. For example, the compound can either be sprayed or otherwise applied in the form of a solution or dispersion, or it can be absorbed on an inert, finely divided solid and applied as a dust. Useful solutions for application by spraying, brushing, dipping, and the like can be prepared by using as the solvent any of the well-known inert horticultural carriers, including neutral hydrocarbons such as kerosene and other light mineral oil distillates of intermediate viscosity and volatility. Adjuvants, such as spreading or wetting agents, can also be included in the solutions, representative materials of this character being fatty acid soaps, rosin salts, saponins, gelatin, casein, long-chain fatty alcohols, alkyl aryl sulfonates, long-chain alkyl sulfonates, phenol-ethylene oxide condensates, $C_{12}$ and $C_{20}$ amines and ammonium salts, and the like. These solutions can be employed as such, or more preferably they can be dispersed or emulsified in water and the resulting aqueous dispersion or emulsion applied as a spray. Solid carrier materials which can be employed include talc, bentonite, lime, gypsum, pyrophyllite and similar inert solid diluents. If desired, the insecticide of the present invention can be employed as an aerosol, as by dispersing the same into the atmosphere by means of a compressed gas.

The concentration of the insecticide to be used with the above carriers is dependent upon many factors, including the carrier employed, the method and conditions of application, and the insect species to be controlled, a proper consideration and resolution of these factors being within the skill of those versed in the insecticide art. In general, however the insecticide of this invention is effective in a concentration of from about 0.01 to 0.5% based upon the total weight of the composition, though under some circumstances as little as about 0.00001% or as much as 2% or even more (for example, up to 25%) of the compound can be employed with good results from an insecticidal standpoint, as wherein high concentrations of active material are used in low-volume sprays or dusts.

When employed as an insecticide, the compound of this invention can be employed either as the sole toxic ingredient or the insecticidal composition, or it can be employed in conjunction with the other insecticidally active materials. Representative insecticides of this latter class include the naturally occurring insecticides such as pyrethrum, rotenone, sabadilla, and the like, as well as the various synthetic insecticides, including DDT, benzene hexachloride, thiodiphenylamine, cyanides, tetraethyl pyrophosphate, diethyl p-nitrophenyl thiophosphate, azobenzene, dimethyl 2,2-dichlorovinyl phosphate, dimethyl 1,2-dibromo-2,2-dichloroethyl phosphate, and the various compounds of arsenic, lead and/or fluorine.

Because of its combination of effective insecticidal action and very low mammalian toxicity, the compound of this invention can be used where many otherwise effective insecticides cannot be used. Included in such applications are: (1) control of both ectoparasites on and endoparasites in warm-blooded animals; (2) control of insects attacking trees, as by application of the insecticide on and/or into the tree; (3) control of insects in stored products in granaries and warehouses; (4) use as fumigants or space sprays in control of insects in public places, such as restaurants, airplanes, busses, offices, markets and the like; (5) use to control insects in and around the home. Doubtless there can be readily visualized other applications for which a stable, highly active insecticide of very low mammalian toxicity would be ideal.

We claim as our invention:

Dimethyl 2-chloro-1-(2,5-dichlorophenyl)vinyl phosphate of the formula:

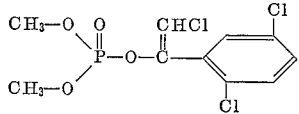

References Cited by the Examiner

UNITED STATES PATENTS

| | | | |
|---|---|---|---|
| 3,003,916 | 10/1961 | Gilbert et al. | 260—957 |
| 3,079,417 | 2/1963 | Farrar | 260—461 |
| 3,089,893 | 5/1963 | Dever et al. | 260—461 |
| 3,091,565 | 5/1963 | Suzuki et al. | 167—30 |
| 3,094,457 | 6/1963 | Birum | 167—30 |
| 3,102,842 | 9/1963 | Phillips et al. | 260—957 |

FOREIGN PATENTS 1,267,967  6/1961  France.

CHARLES B. PARKER, *Primary Examiner.*

F. M. SIKORA, R. L. RAYMOND,
*Assistant Examiners.*